United States Patent
Kadowaki et al.

(10) Patent No.: US 7,542,872 B2
(45) Date of Patent: Jun. 2, 2009

(54) FORM MEASURING INSTRUMENT, FORM MEASURING METHOD AND FORM MEASURING PROGRAM

(75) Inventors: Soichi Kadowaki, Kawasaki (JP); Tsukasa Kojima, Sapporo (JP); Tomonori Goto, Sapporo (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/701,438

(22) Filed: Feb. 2, 2007

(65) Prior Publication Data

US 2007/0198212 A1 Aug. 23, 2007

(30) Foreign Application Priority Data

Feb. 10, 2006 (JP) .............................. 2006-034231

(51) Int. Cl.
 G06F 9/45 (2006.01)
(52) U.S. Cl. ........................ 702/168; 702/152; 702/153; 33/503; 33/559; 73/105; 73/601; 73/614
(58) Field of Classification Search ................... 702/95, 702/127, 152, 153, 155, 168, 167, 150; 33/504, 33/503, 520, 501, 559; 708/809; 700/258, 700/195, 100, 159, 177; 901/44, 46, 5; 73/104, 73/105, 1.89; 356/376, 243.4, 375, 601, 356/614, 237.2, 602
See application file for complete search history.

(56) References Cited

U.S. PATENT DOCUMENTS

| | | | | |
|---|---|---|---|---|
| 4,611,916 A * | 9/1986 | Yoshizumi | .................. | 356/489 |
| 4,630,381 A * | 12/1986 | Sakata et al. | .................. | 33/503 |
| 4,653,011 A * | 3/1987 | Iwano | ........................ | 700/258 |
| 4,688,184 A * | 8/1987 | Taniguti et al. | ............. | 702/167 |
| 5,018,280 A * | 5/1991 | Enderle et al. | ................. | 33/832 |
| 5,088,055 A | 2/1992 | Oyama | | |
| 5,283,630 A * | 2/1994 | Yoshizumi | .................. | 356/601 |
| 5,822,450 A * | 10/1998 | Arakawa et al. | ............. | 382/152 |
| 6,044,569 A * | 4/2000 | Ogihara et al. | ................ | 33/503 |
| 6,055,056 A * | 4/2000 | Kuehmstedt et al. | ......... | 356/601 |
| 6,112,423 A * | 9/2000 | Sheehan | ....................... | 33/502 |
| 6,374,198 B1 * | 4/2002 | Schifa et al. | .................... | 703/2 |

(Continued)

FOREIGN PATENT DOCUMENTS

JP A 63-117209 5/1988

(Continued)

*Primary Examiner*—Carol S Tsai
(74) *Attorney, Agent, or Firm*—Oliff & Berridge, PLC (57) ABSTRACT

A form measuring instrument measures a form of a surface of an object to be measured using a contact to follow the surface. A pseudo-measurement point acquirer acquires positional coordinates of the reference point of the contact as pseudo-measurement points when the contact touches the object at a plurality of locations. A normal vector generator estimates a surface or line along the pseudo-measurement points from the pseudo-measurement points to calculate normal vectors extending from the pseudo-measurement points to the surface or line. A contact model locator locates contact models which specify the surface form of the contact so as to coincide the pseudo-measurement points with reference points of the contact models and so as to coincide attitudes of the contact on measurement with attitudes of the contact models. A measurement point calculator calculates cross points as measurement points, at which the normal vectors cross the surfaces of the located contact models.

19 Claims, 10 Drawing Sheets

U.S. PATENT DOCUMENTS

| | | | |
|---|---|---|---|
| 6,583,869 B1* | 6/2003 | Sheridan | 356/153 |
| 6,763,319 B2* | 7/2004 | Handa et al. | 702/168 |
| 7,039,550 B2* | 5/2006 | Noda | 702/168 |
| 7,100,429 B2* | 9/2006 | Matsuki et al. | 73/105 |
| 7,162,383 B2* | 1/2007 | Takemura | 702/95 |
| 2002/0183964 A1 | 12/2002 | Handa et al. | |
| 2002/0189120 A1* | 12/2002 | Kaneda et al. | 33/636 |
| 2005/0076522 A1* | 4/2005 | Matsuki et al. | 33/554 |
| 2005/0132591 A1* | 6/2005 | Kojima et al. | 33/503 |

FOREIGN PATENT DOCUMENTS

| | | |
|---|---|---|
| JP | A 02-172657 | 7/1990 |
| JP | A 2000-046543 | 2/2000 |
| JP | A 2002-131041 | 5/2002 |
| JP | A 2002-357415 | 12/2002 |

* cited by examiner

FORM MEASURING INSTRUMENT, FORM MEASURING METHOD AND FORM MEASURING PROGRAM

CROSS REFERENCE TO RELATED APPLICATION

This application is based on and claims the benefit of priority from the prior Japanese Patent Application No. 2006-34231, filed on Feb. 10, 2006, the entire contents of which are incorporated herein by reference.

BACKGROUND OF THE INVENTION

1. Field of the Invention

The present invention relates to a form measuring instrument, form measuring method and form measuring program, for example, a three-dimensional measuring machine operative to achieve displacement measurements using a contact.

2. Description of the Related Art

A touch probe (contact) is used in a contact measuring system in which the contact is generally assumed as a sphere of which central position is given as a measurement point. The measurement point in this case differs from the position at which the contact touches an object to be measured and accordingly contains errors from the actual form of the object. The errors have been eliminated by regarding the form of the contact as an ideal sphere and offsetting the radius of the tip sphere to obtain coordinate values much closer to the actual form of the object in correction processing.

The position to be obtained on the object depends on the form of the contact and a high precision, measurement point acquisition requires the consideration of the form of the contact. The recent improvement in measurement accuracy causes a situation in which the pervious correction processing that regards the form of the contact as an ideal sphere fails to achieve sufficient accuracy. Thus, there is the need for developing a high precision, measurement point acquisition method in consideration of a new contact form.

In such the situation, Patent Document (U.S. Pat. No. 6,763,319) proposes a form measuring instrument configured to use form error data of a contact obtained through a measurement of a reference form object serving as a calibration reference to correct measurement errors of the object to be measured due to form errors of the contact.

The form measuring instrument disclosed in the Patent Document calculates the contact position of the contact to the object on the assumption that the tip of the contact is a true sphere, and corrects a measured value on the contact position using corresponding error data. Therefore, the deflection of the tip of the contact from the true sphere is not considered to also deflect the contact position. If the contact is any other form than the true sphere, the instrument is not applicable as a problem.

The present invention has been made in consideration of such the problem and has an object to provide a form measuring instrument, form measuring method and form measuring program capable of accurately calculating measurement points even if the form of the contact is not an ideal sphere.

SUMMARY OF THE INVENTION

The present invention provides a first, form measuring instrument for measuring a form of a surface of an object to be measured using a contact to follow the surface. The instrument comprises a pseudo-measurement point acquirer operative to acquire positional coordinates of the reference point of the contact as pseudo-measurement points when the contact touches the object at a plurality of locations; a normal vector generator operative to estimate a surface or line along the pseudo-measurement points from the pseudo-measurement points to calculate normal vectors extending from the pseudo-measurement points to the surface or line; a contact model locator operative to locate contact models which specify the surface form of the contact so as to coincide the pseudo-measurement points with reference points of the contact models and so as to coincide attitudes of the contact on measurement with attitudes of the contact models; and a measurement point calculator operative to calculate cross points as measurement points, at which the normal vectors cross the surfaces of the located contact models.

The present invention also provides a second, a form measuring instrument for measuring a form of a surface of an object to be measured using a contact to follow the surface, The instrument comprises a pseudo-measurement point acquirer operative to acquire positional coordinates of the reference point of the contact as pseudo-measurement points when the contact touches the object at a plurality of locations; an orthogonal cross point calculator operative to calculate orthogonal cross points to a designed surface defined by designed values of the object from the pseudo-measurement points; a contact model locator operative to locate the contact models which specify the surface form of the contact so as to coincide the pseudo-measurement points with reference points of the contact models and so as to coincide attitudes of the contact on measurement with attitudes of the contact models; and a measurement point calculator operative to calculate cross points as measurement points, at which straight lines connecting the pseudo-measurement points and the orthogonal cross points cross the designed surfaces of the contact models.

The present invention also provides a first, form measuring method for measuring a form of a surface of an object to be measured using a contact to follow the surface. The method comprises a pseudo-measurement point acquisition step of acquiring positional coordinates of the reference point of the contact as pseudo-measurement points when the contact touches the object at a plurality of locations; a normal vector generation step of estimating a surface or line along the pseudo-measurement points from the pseudo-measurement points to calculate normal vectors extending from the pseudo-measurement points to the surface or line; a contact model location step of locating contact models which specify the surface form of the contact so as to coincide the pseudo-measurement points with reference points of the contact models and so as to coincide attitudes of the contact on measurement with attitudes of the contact models; and a measurement point calculation step of calculating cross points as measurement points, at which the normal vectors cross the surfaces of the located contact models.

The present invention also provides a second, form measuring method for measuring a form of a surface of an object to be measured using a contact to follow the surface. The method comprises a pseudo-measurement point acquisition step of acquiring positional coordinates of the reference point of the contact as pseudo-measurement points when the contact touches the target at a plurality of locations; an orthogonal cross point calculation step of calculating orthogonal cross points to a designed surface defined by designed values of the object from the pseudo-measurement points; a contact model location step of locating contact models which specify the surface form of the contact so as to coincide the pseudo-measurement points with reference points of the contact models and so as to coincide attitudes of the contact on measurement with attitudes of the contact models; and a measurement point calculation step of calculating cross points as measurement points, at which straight lines connecting the pseudo-measurement points and the orthogonal cross points cross the designed surfaces of the contact models.

The present invention also provides a first, computer-executable, form measuring program for measuring a form of surface of an object to be measured using a contact to follow the surface. The program comprises a pseudo-measurement point acquisition step of acquiring positional coordinates of the reference point of the contact as pseudo-measurement points when the contact touches the object at a plurality of locations; a normal vector generation step of estimating a surface or line along the pseudo-measurement points from the pseudo-measurement points to calculate normal vectors extending from the pseudo-measurement points to the surface or line; a contact model location step of locating contact models which specify the surface form of the contact so as to coincide the pseudo-measurement points with reference points of the contact models and so as to coincide attitudes of the contact on measurement with attitudes of the contact models; and a measurement point calculation step of calculating cross points as measurement points, at which the normal vectors cross the surfaces of the located contact models.

The present invention also provides a second, computer-executable, form measuring program for measuring a form of a surface of an object to be measured using a contact to follow the surface. The program comprises a pseudo-measurement point acquisition step of acquiring positional coordinates of the reference point of the contact as pseudo-measurement points when the contact touches the object at a plurality of locations; an orthogonal cross point calculation step of calculating orthogonal cross points to a designed surface defined by designed values of the object from the, pseudo-measurement points; a contact model location step of locating contact models which specify the surface form of the contact so as to coincide the pseudo-measurement points with reference points of the contact models and so as to coincide attitudes of the contact on measurement with attitudes of the contact models; and a measurement point calculation step of calculating cross points as measurement points, at which straight lines connecting the pseudo-measurement points and the orthogonal cross points cross the designed surfaces of the contact models.

DETAILED DESCRIPTION OF THE EMBODIMENTS

A form measuring instrument according to an embodiment of the present invention will now be described in conjunction with the drawings.

First Embodiment

Figure 1:
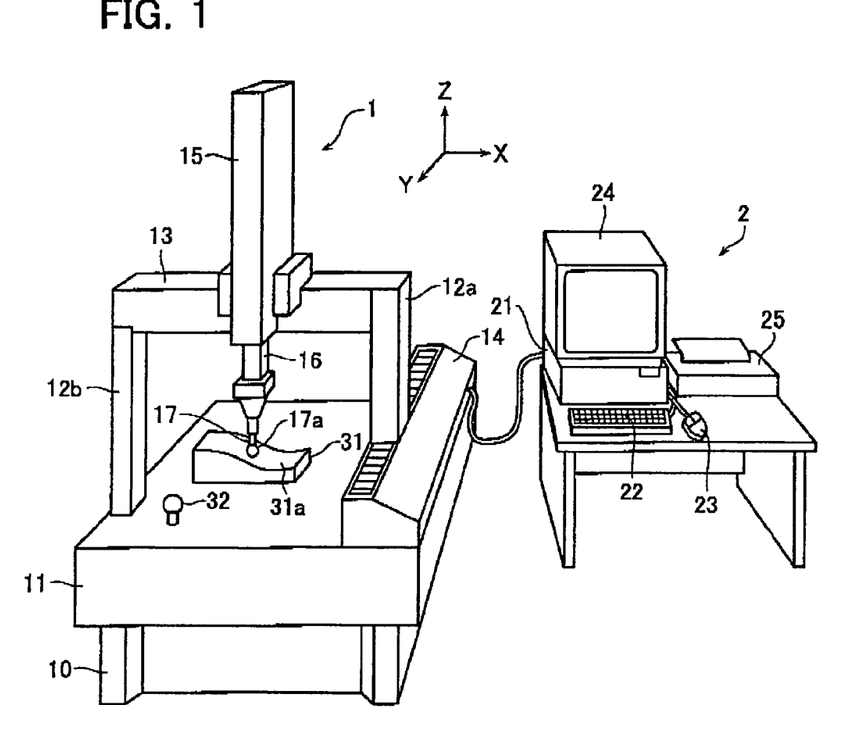
FIG. 1 is a schematic arrangement diagram of a form measuring instrument according to a first embodiment of the present invention.

FIG. 1 is a perspective view illustrative of a brief arrangement of a form measuring instrument according to a first embodiment of the present invention. This form measuring instrument comprises a three-dimensional measuring machine 1 and a computer 2 operative to drive control the three-dimensional measuring machine 1 to take in necessary measured values and execute arithmetic processing required for form processing.

The three-dimensional measuring machine 1 is configured as shown in FIG. 1, for example, and includes a vibration-proof table 10 on which a stationary base 11 is mounted with the upper surface thereof serving as a base plane that matches the horizontal plane. From both sides of the stationary base 11 stand beam supports 12a, 12b having upper ends that support a beam 13 extending in the X-axis direction. The beam support 12a has a lower end that is driven in the Y-axis direction by a Y-axis drive mechanism 14. The beam support 12b has a lower end that is supported on an air-bearing movable in the Y-axis direction relative to the stationary base 11. The beam 13 supports a column 15 extending in the vertical direction (Z-axis direction). The column 15 is driven in the X-axis direction along the beam 13. The column 15 is provided with a spindle 16 that is driven in the Z-axis direction. The spindle 16 has a lower end equipped with a touch probe 17. The touch probe 17 has a contact 17a formed at the tip in any form such as an oval spherical form. When the contact 17a touches a workpiece (an object to be measured) 31 mounted on the stationary base 11, it provides a touch signal, which controls the computer 2 to take in X, Y and Z coordinate values of the reference position of the contact 17a at that time. On a certain position of the stationary base 11 is mounted a reference ball 32 for constructing a mechanical coordinate system later described. The reference ball 32 is a steel ball, a ceramic ball or the like.

The computer 2 comprises a computer body 21, a keyboard 22, a mouse 23, a CRT 24 and a printer 25.

Figure 2:
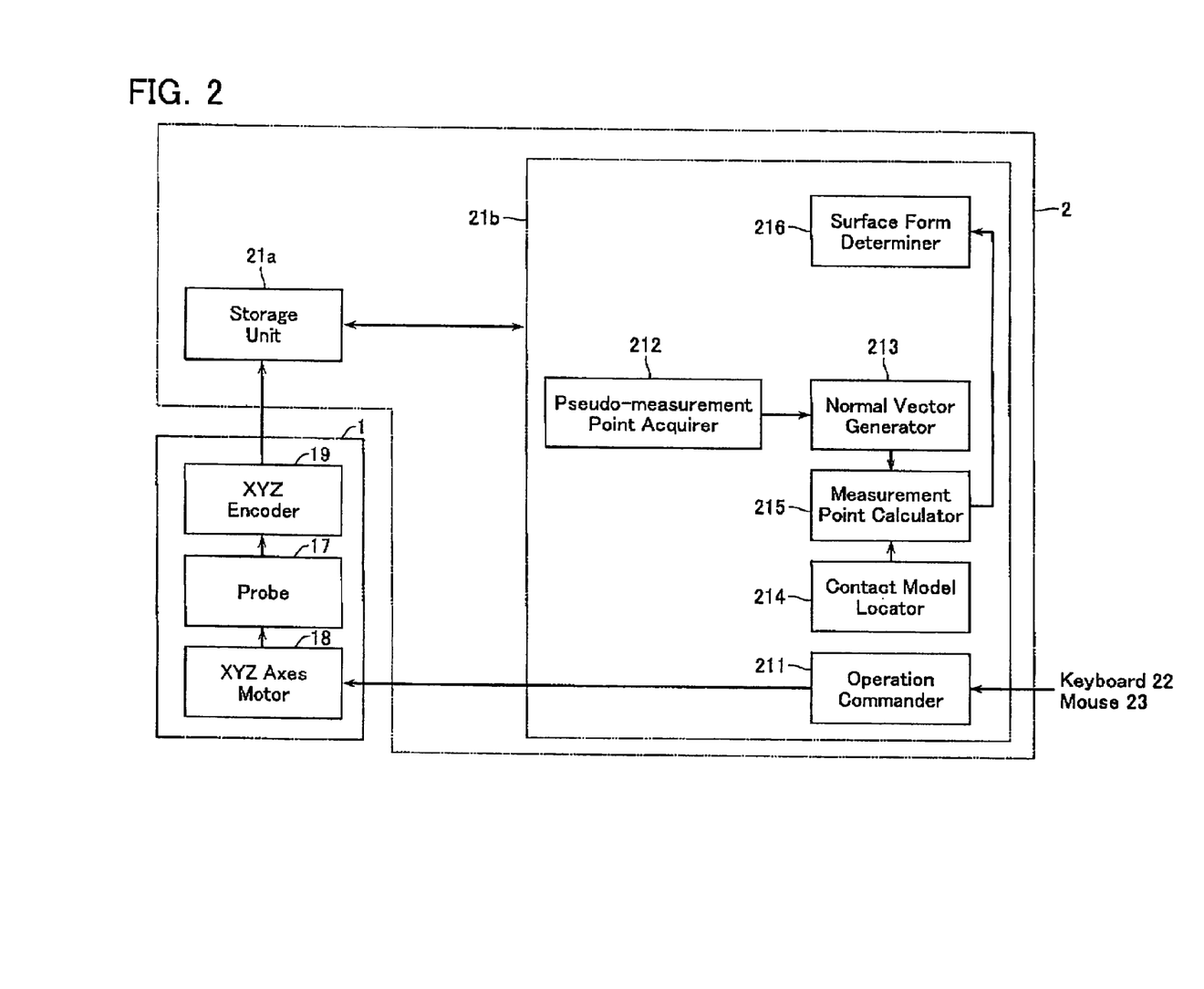
FIG. 2 is a functional block diagram of the form measuring instrument according to the first embodiment of the present invention.

FIG. 2 is a functional block diagram of the form measuring instrument.

The three-dimensional measuring machine 1 contains a XYZ axes motor 18 for driving the probe 17 in the X, Y and Z directions, and a XYZ encoder 19 operative in response to movements in the X, Y and Z directions to provide movement pulses in respective directions. The XYZ encoder 19 acquires positional information (such as the center of gravity of the contact 17a) when the contact 17a touches the workpiece 31. The acquired positional information is stored in a storage unit 21b.

The computer body 21 of the computer 2 mainly comprises a storage unit 21a composed of a HDD, a semiconductor memory or the like, and a controller 21b. The controller 21b may include a form measuring program for calculating measurement points or driving the three-dimensional measuring machine 1 based on the information stored in the storage unit 21a, and a CPU operative to execute the program.

The storage unit 21a may store information about the position and attitude of the contact 17a on measurement, information about the contact form used in measurement, and other information calculated by the controller 21b later described.

The controller 21b comprises an operation commander 211, a pseudo-measurement point acquirer 212, a normal vector generator 213, a contact model locator 214, a measurement point calculator 215, and a form determiner 216.

The operation commander 211 drives the XYZ axes motor 18 based on input values from the keyboard 22 and the mouse 23 such that the contact 17a follows the surface 31a of the workpiece 31.

The pseudo-measurement point acquirer 212 acquires positional information about the reference point (such as the position of the center of gravity) of the contact 17a as pseudo-measurement points when the contact 17a touches the workpiece 31 at a plurality of locations.

The normal vector generator 213 estimates a surface along the pseudo-measurement points, and generates normal vectors that extend from the pseudo-measurement points to the surface, through a method of creating, for example, a free curved surface from the pseudo-measurement points and deriving normals that extend from the pseudo-measurement points and orthogonally cross the free curved surface, or a method of deriving normals that extend from the pseudo-measurement points based on a surface specified by the pseudo-measurement points in the vicinity thereof.

The contact model locator 214 reads the storage unit 21a for contact models previously set to specify a surface form of the contact 17a for use in a certain measurement and the information about the attitude of the contact 17a on measurement. The contact model locator 214 locates the contact models so as to coincide the pseudo-measurement points with reference points of the contact models and so as to coincide attitudes of the contact on measurement with attitudes of the contact models. The contact model locator 214 performs this processing over the whole measurement points. The reference point of the contact model is specific information about the position of the contact model and is equal to information about the position of the probe 17 obtained from the XYZ encoder 18.

The measurement point calculator 215 calculates cross points as measurement points, at which the normal vectors cross the surfaces of the located contact models.

The surface form determiner 216 determines the form of the workpiece 31 based on the measurement points calculated at the measurement point calculator 215. The information obtained at the controller 21b is stored in the storage unit 21a.

Figure 3:
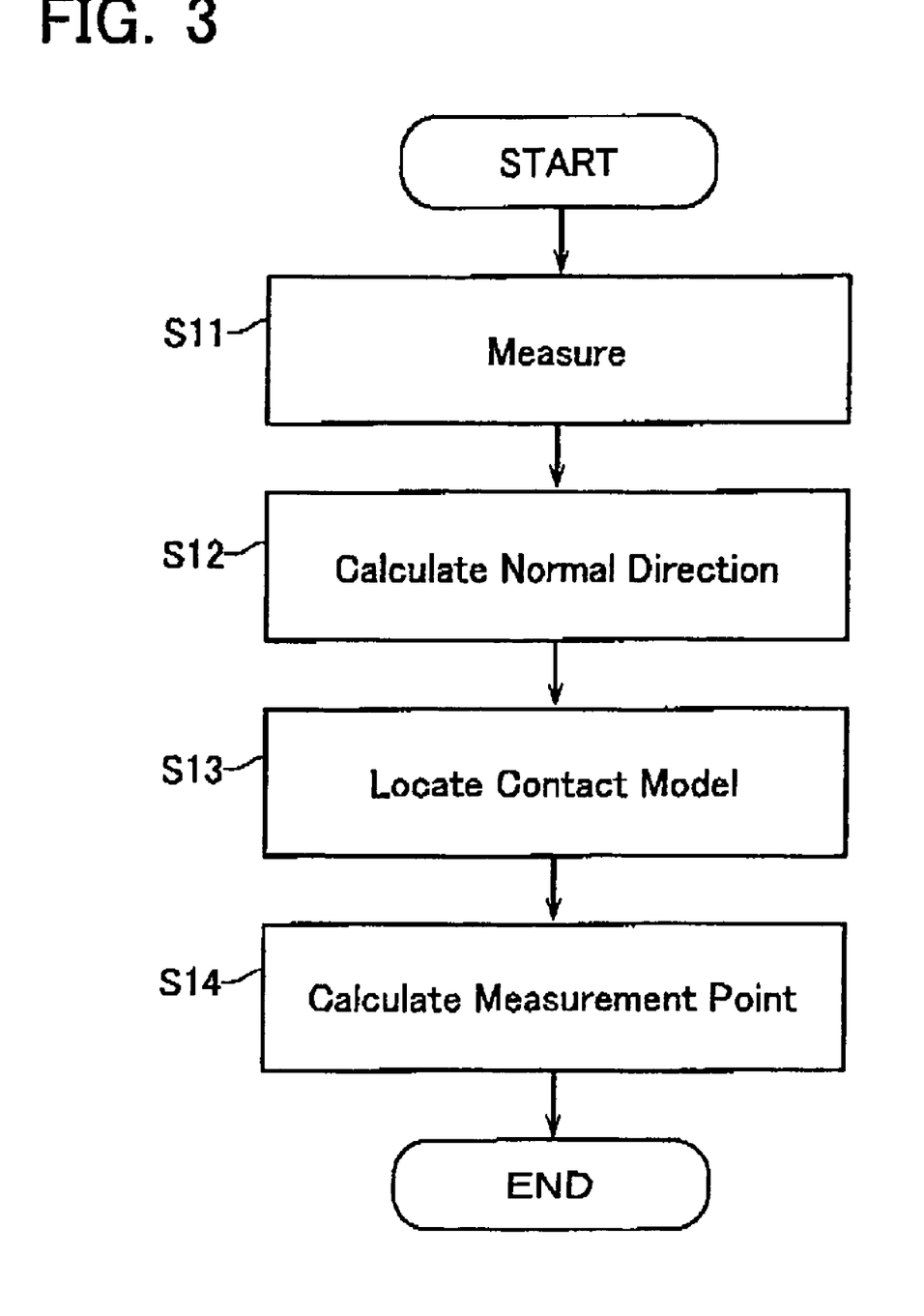
FIG. 3 is a flowchart illustrative of a measurement point calculation method in the form measuring instrument according to the first embodiment of the present invention.

Along a flowchart shown in FIG. 3 and appropriately with reference to FIGS. 4-7, a measurement point calculation method executed in the form measuring instrument according to the first embodiment is described. For simplification, FIGS. 4-7 two-dimensionally illustrate cross-sectional views of the workpiece 31.

Figure 4:
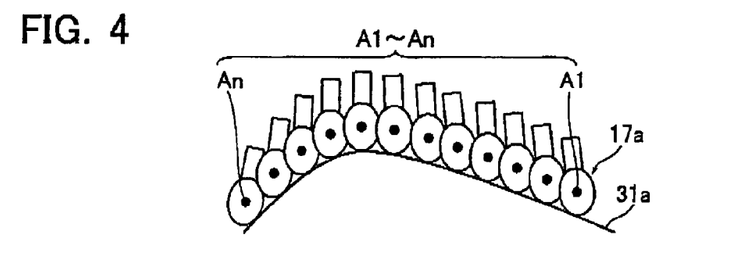
FIG. 4 is a view illustrative of operation of a contact of the form measuring instrument according to the first embodiment of the present invention.

First, as shown in FIG. 4, the keyboard 22 and the mouse 23 are manipulated to operate the operation commander 211 such that the contact 17a touches the surface 31a of the workpiece 31 and the probe 17 scans the surface in the X and Y directions. In this case, the pseudo-measurement point acquirer 212 can acquire pseudo-measurement points A1-An (step S11). The measurement in the step S11 may be either a point measurement or a scanning measurement.

Figure 5:
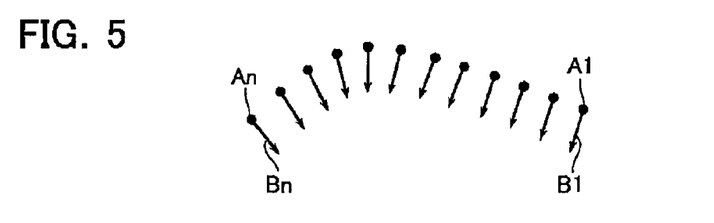
FIG. 5 is a view illustrative of operation of the contact of the form measuring instrument according to the first embodiment of the present invention.

Subsequently, as shown in FIG. 5, the normal vector generator 213 calculates normal vectors B1-Bn extending from the pseudo-measurement points A1-An to an estimated free curved surface or a surface specified from near measurement points (step S12).

Figure 6:
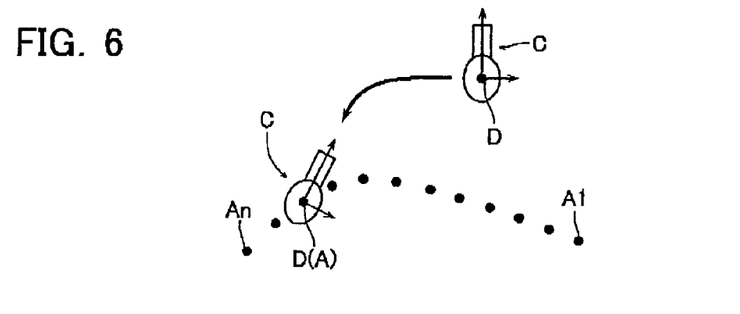
FIG. 6 is a view illustrative of operation of the contact of the form measuring instrument according to the first embodiment of the present invention.

Then, as shown in FIG. 6, the contact model locator 214 locates the contact models C so as to coincide the pseudo-measurement points A1-An with reference points D (certain position) of the contact model C and so as to coincide attitudes of the contact 17a on measurement with attitudes of the contact models C (step S13). The contact model locator 214 performs this processing over the whole pseudo-measurement points A1-An.

Figure 7:
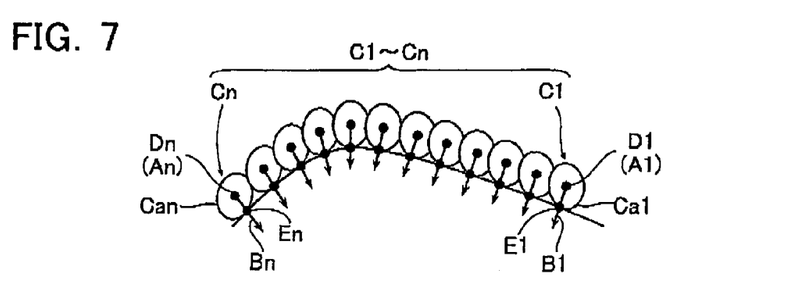
FIG. 7 Is a view illustrative of operation of the contact of the form measuring instrument according to the first embodiment of the present invention.

Subsequently, as shown in FIG. 7, the measurement point calculator 215 calculates cross points at which the surfaces Ca1-Can of the contact models C1-Cn cross the normal vectors B1-Bn, as measurement points E1-En. The surface form determiner 216 determines the form of the workpiece 31 based on the measurement points E1-En (step S14) and then the control terminates the flow.

Second Embodiment

Figure 8:
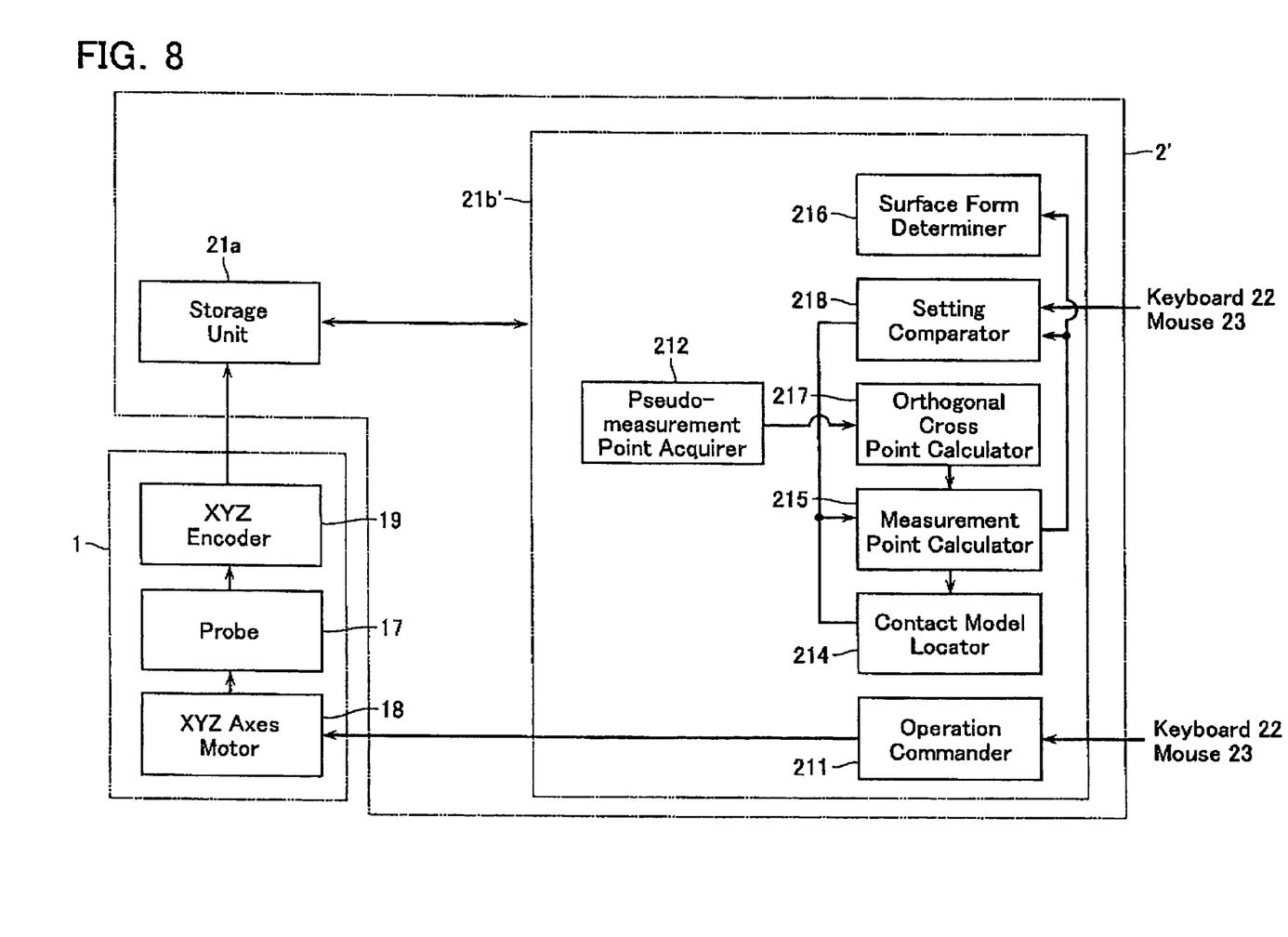
FIG. 8 is a functional block diagram of a form measuring instrument according to a second embodiment of the present invention.

A form measuring instrument according to a second embodiment of the present invention is described next with reference to FIG. 8.

The form measuring Instrument according to the second embodiment is different from the first embodiment only in the configuration of the controller in the computer body. The surface form of the workpiece is previously stored in the storage unit 21a as a surface form setting and the surface form of the workplace is calculated based on the surface form setting.

The controller 21b' of the computer 2' of the second embodiment includes an orthogonal cross point calculator 217 and a setting comparator 218, instead of the normal vector generator 213, remaining other configurations same as those in the first embodiment.

In the second embodiment, a measurement is performed based on the surface form setting stored in the storage unit 21a.

The orthogonal cross point calculator 217 calculates orthogonal cross points to a surface (hereinafter referred to as a surface form setting) defined by designed values of the workpiece 31 from the measured pseudo-measurement points.

The setting comparator 218 obtains distances between the orthogonal cross points and the measurement points calculated at the measurement point calculator 215 as described later. The setting comparator 218 uses a square sum of the distances as an estimation, and translates and rotates the surface form setting or the measurement points until the estimation converges.

Figure 9:
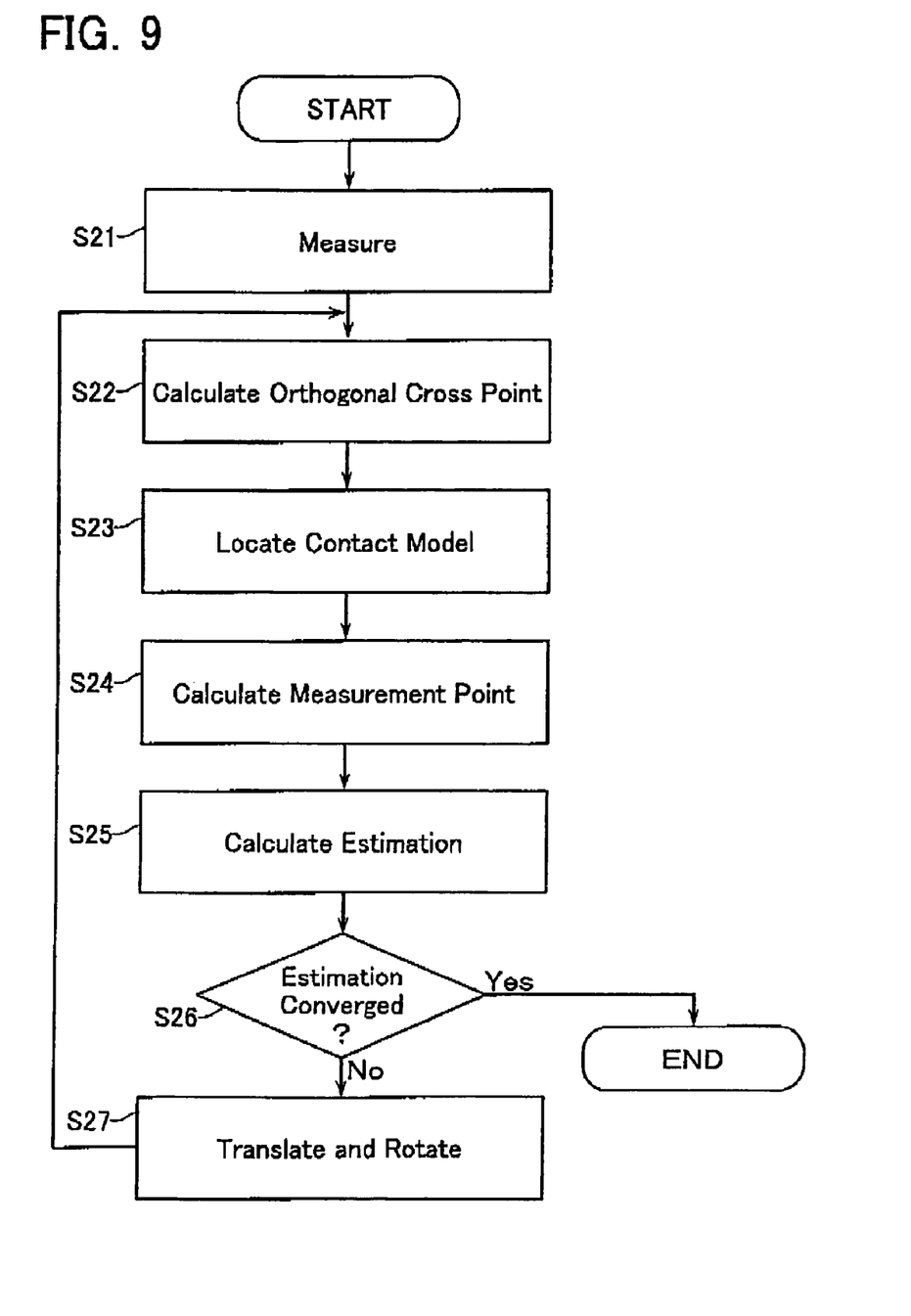
FIG. 9 is a flowchart illustrative of a measurement point calculation method in the form measuring instrument according to the second embodiment of the present invention.

Along a flowchart shown in FIG. 9 and appropriately with reference to FIGS. 10-13, a measurement point calculation method in the form measuring instrument according to the second embodiment is described. For simplification, FIGS. 10-13 two-dimensionally illustrate cross-sectional views of the workplace 31.

Figure 10:
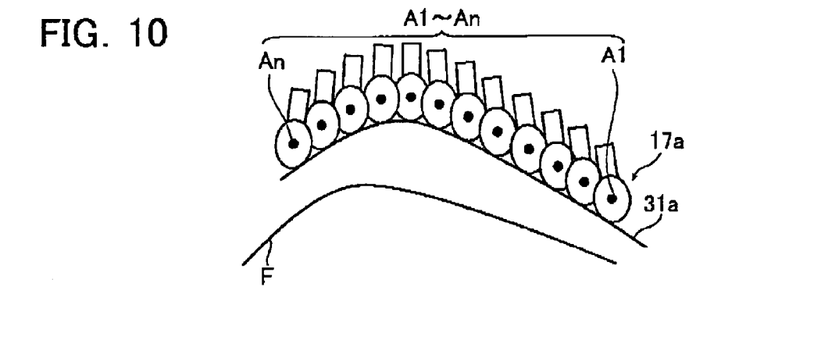
FIG. 10 is a view Illustrative of operation of a contact of the form measuring instrument according to the second embodiment of the present invention.

First, as shown in FIG. 10, based on the surface form setting F, the operation commander 211 operates such that the contact 17a touches the surface 31a of the workpiece 31 and the probe 17 scans the surface in the X and Y directions to measure the surface 31a of the workpiece 31. In this case, the pseudo-measurement point acquirer 212 can acquire pseudo-measurement points A1-An (step S21). The measurement in the step S21 may be either a point measurement or a scanning measurement.

Figure 11:
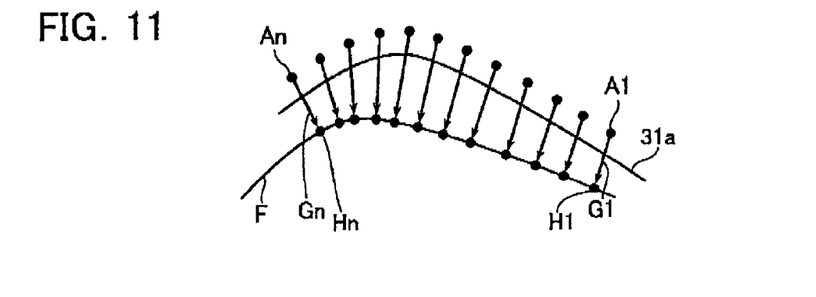
FIG. 11 is a view illustrative of operation of the contact of the form measuring instrument according to the second embodiment of the present Invention.

Subsequently, as shown in FIG. 11, the orthogonal cross point calculator 217 calculator orthogonal cross vectors G1-Gn extending from the measured pseudo-measurement points A1-An and orthogonally crossing the surface form setting F and calculates orthogonal cross points H1-Hn thereof (step S22).

Then, as once shown in FIG. 6 in the above-described first embodiment, the contact model locator 214 locates the contact models C so as to coincide the pseudo-measurement points A1-An with reference points D (certain position) of the contact model C and so as to coincide attitudes of the contact 17a on measurement with attitudes of the contact models C (step S23)

Figure 12:
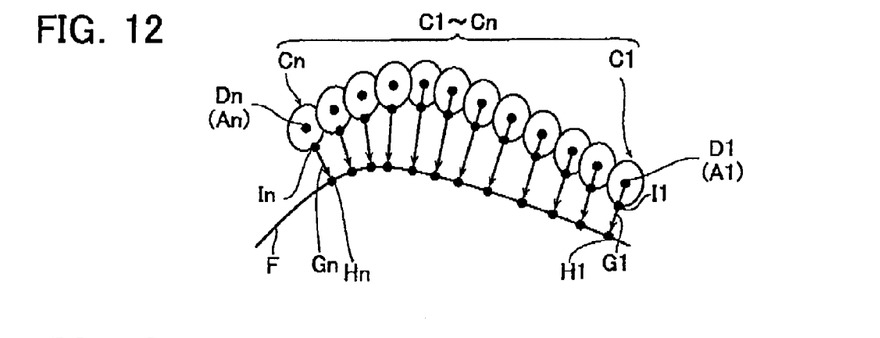
FIG. 12 is a view illustrative of operation of the contact of the form measuring instrument according to the second embodiment of the present invention.

Subsequently, as shown in FIG. 12, the measurement point calculator 215 calculates cross points as measurement points I1-In, at which the orthogonal cross vectors G1-Gn cross the surfaces Ca1-Can of the contact models C1-Cn. The surface form determiner 216 determines the form of the workpiece 31 based on the measurement points (step S24).

Figure 13:
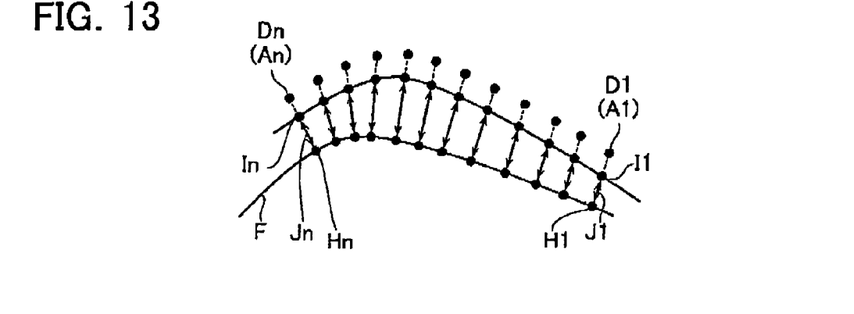
FIG. 13 is a view illustrative of operation of the contact of the form measuring instrument according to the second embodiment of the present invention.

Then, as shown in FIG. 13, the setting comparator 218 calculates a square sum of the distances J1-Jn between the measurement points I1-In obtained at the step S24 and the orthogonal cross points H1-Hn (step S25).

Subsequently, the setting comparator 218 determines whether or not the estimation converges (step S26).

If it is determined at the step S26 that the estimation sufficiently converges (step S26, Yes), the surface form of the workpiece 31 is determined and the control terminates the flow.

On the other hand, if it is determined at the step S26 that the estimation does not sufficiently converge (step S26, No), the surface form setting F is translated and rotated (step S27) and the steps from the step S22 are repeatedly executed again.

Third Embodiment

Figure 14:
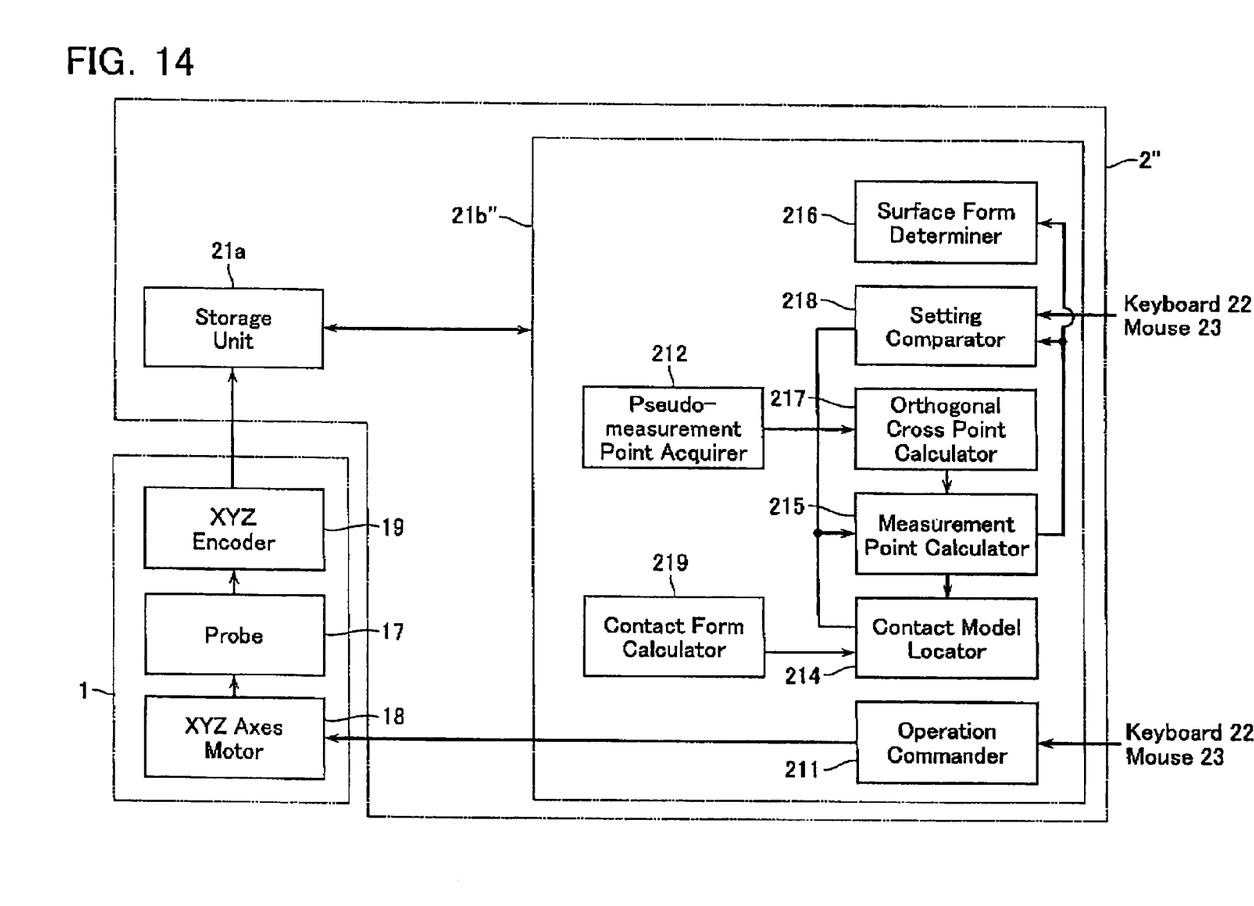
FIG. 14 is a functional block diagram of a form measuring instrument according to a third embodiment of the present Invention.

A form measuring instrument according to a third embodiment of the present invention is described next with reference to FIG. 14. The form measuring instrument according to the third embodiment is different from the second embodiment only in the configuration of the controller In the computer body and is provided with a contact modeling executable configuration. The contact modeling herein comprises measuring a known-form, high-precision reference work (such as a known-radius, high-precision reference ball), and repeatedly comparing the reference work with the measurement points obtained with the use of the algorithms given in the above-described first and second embodiments to obtain high-precision contact models. The form measuring instrument according to the third embodiment comprises a contact form calculator 219 operative to execute modeling the contact, which is further added in the controller 21b" of the computer 2". The contact model may be expressed by means of a free curved surface, a conicoind, a triangle mesh and the like.

Figure 15:
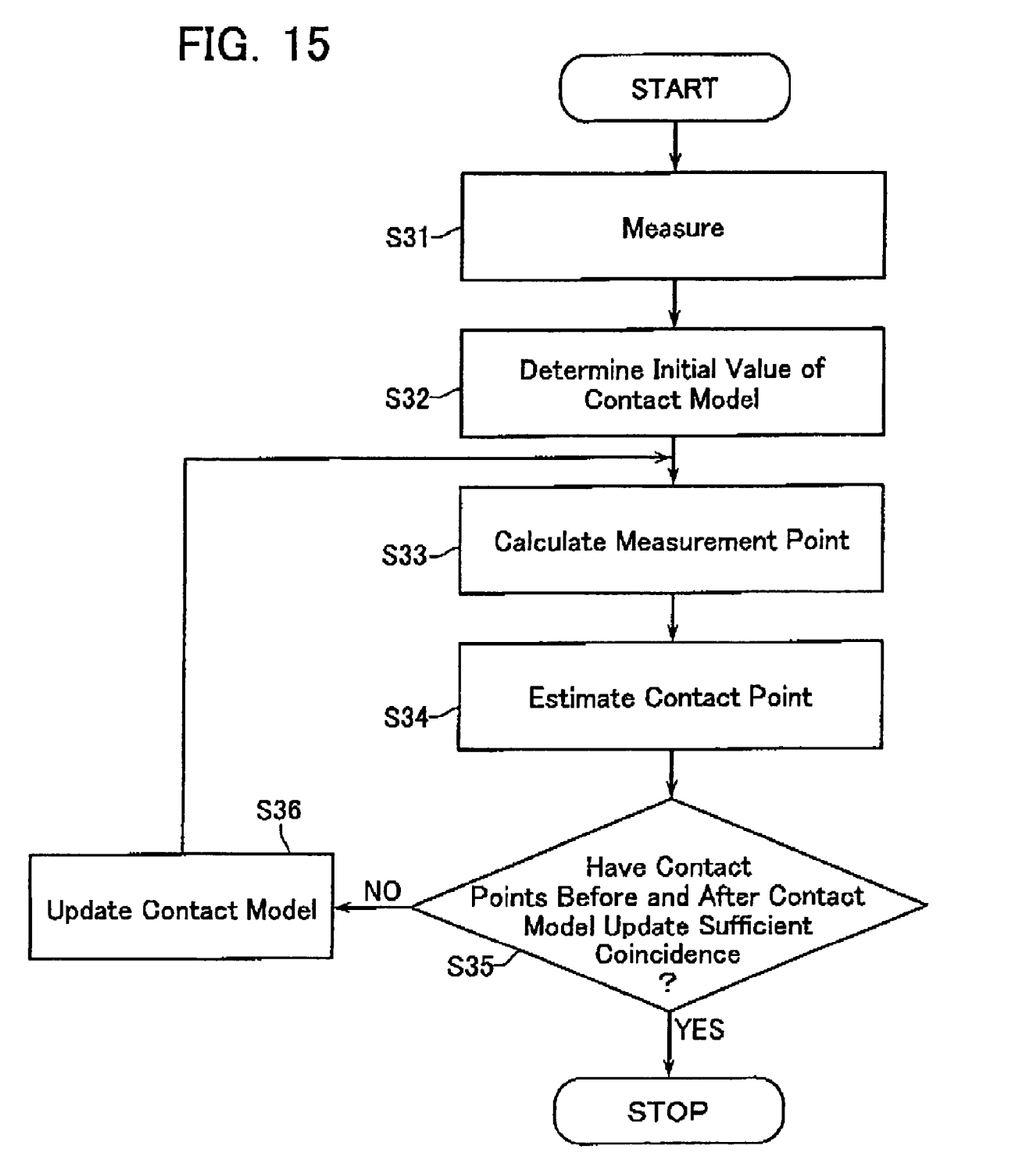
FIG. 15 is a flowchart illustrative of a method of calculating the contact model in the form measuring instrument according to the third embodiment of the present invention.
Figures 16A, 16B:
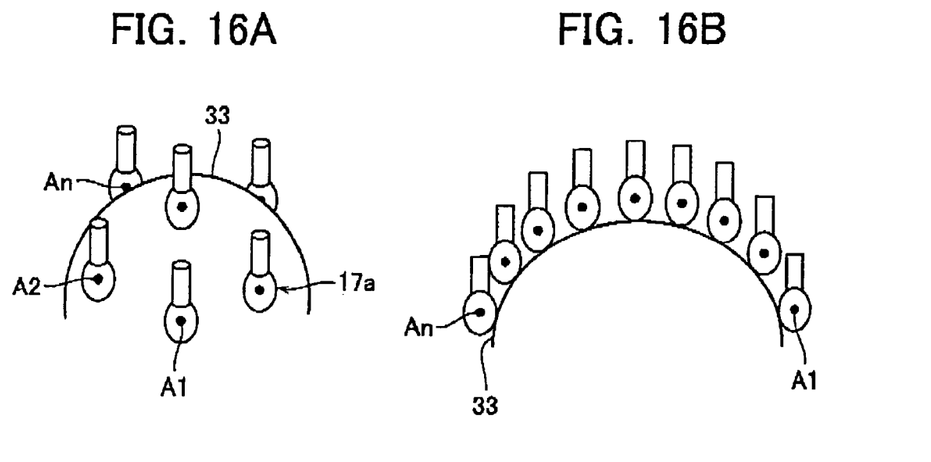
FIG. 16A is a view illustrative of a measurement with a contact surface that uniformly touches a reference work in the form measuring instrument according to the third embodiment of the present invention.
FIG. 16B is a view illustrative of a measurement with the contact surface that uniformly touches a reference work in the form measuring instrument according to the third embodiment of the present invention.
Figure 17:
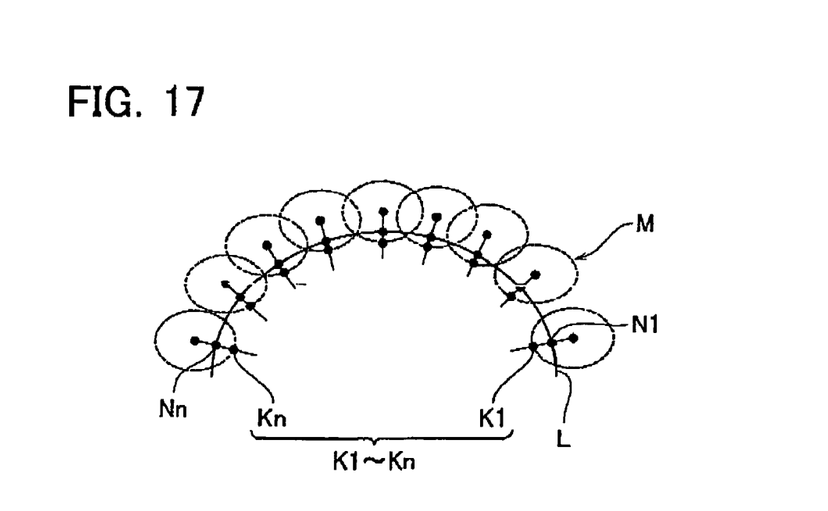
FIG. 17 is a view illustrative of an example of measurement points by contact models that do not have sufficient coincidences with designed values of the reference work in the form measuring instrument according to the third embodiment of the present invention.

Along a flowchart shown in FIG. 15 and appropriately with reference to FIGS. 16A, 16B and 17, a method of calculating the contact model in the form measuring instrument according to the third embodiment is described.

First, as shown in FIGS. 16A and 16B, a known-form, high-precision reference work 33 (such as the reference ball 32) is measured from various directions such that the surface of the contact 17a uniformly touches the work (step 31). Next, an initial value of the contact model is given (step 32). The initial value may include the designed value of the contact 17a stored in the storage unit 21a or the like. Subsequently, from the measured values obtained in the step S31, using the initial value of the contact model given in the step S32, the same method as in the above-described first or second embodiment is applied to estimate measurement points (step 33). Next, as shown in FIG. 17, the estimated values K1-KN of the measurement points are compared with designed value L of the reference work, thereby obtaining points N1-Nn (contact points after contact model update) on the surface of the original contact model M relative to points (contact points before contact model update) on the surface of the contact model M that give the estimated values K1-Kn of the measurement points (step 34), and determining whether or not the contact points before and after contact model update have a sufficient coincidence (step 35). If the contact points before and after contact model update do not have a sufficient coincidence (step 35, NO), the contact models are updated and the steps are repeated from the step 33 (step 36). On the other hand, If the contact models have a sufficient coincidence (step 35, YES), the control terminates the flow without updating the contact models. This enables high-precision contact models to be obtained.

The embodiments of the invention have been described above though the present invention is not limited to these embodiments but rather can be given various modifications, additions and replacements without departing from the scope and spirit of the invention. For example, the above embodiments exemplify the three-dimensional measurement though the present invention is also applicable to a two-dimensional measuring machine (such as a contraser) other than the three-dimensional measuring machine. When the present invention is applied to such a two-dimensional measuring machine, normal vectors may be calculated relative to a free curve, a polynomial curve, a folded line and the like. In the above embodiments the contact has an oval spherical form though the form of the contact is not limited to this form.

What is claimed is:

1. A form measuring instrument for measuring a form of a surface of an object to be measured using a contact to follow the surface, the instrument comprising:
    a pseudo-measurement point acquirer operative to acquire positional coordinates of the reference point of the contact as pseudo-measurement points when the contact touches the object at a plurality of locations;
    a normal vector generator operative to estimate a surface or line along the pseudo-measurement points from the pseudo-measurement points to calculate normal vectors extending from the pseudo-measurement points to the surface or line;
    a contact model locator operative to locate contact models which are located in a pseudo space generated by computing and that specify the surface form of the contact so as to coincide the pseudo-measurement points with reference points of the contact models and so as to coincide attitudes of the contact on measurement with attitudes of the contact models; and
    a measurement point calculator operative to calculate cross points as measurement points, at which the normal vectors cross the surfaces of the located contact models.

2. A form measuring instrument for measuring a form of a surface of an object to be measured using a contact to follow the surface, the instrument comprising:
    a pseudo-measurement point acquirer operative to acquire positional coordinates of the reference point of the contact as pseudo-measurement points when the contact touches the object at a plurality of locations;
    an orthogonal cross point calculator operative to calculate orthogonal cross points to a designed surface defined by designed values of the object from the pseudo-measurement points;
    a contact model locator operative to locate the contact models which are located in a pseudo space generated by computing and that specify the surface form of the contact so as to coincide the pseudo-measurement points with reference points of the contact models and so as to coincide attitudes of the contact on measurement with attitudes of the contact models; and
    a measurement point calculator operative to calculate cross points as measurement points, at which straight lines connecting the pseudo-measurement points and the orthogonal cross points cross the designed surfaces of the contact models.

3. The form measuring instrument according to claim 2, further comprising a setting comparator operative to use as an estimation a square sum of distances between the measurement points and the orthogonal cross points, and to translate and rotate the designed surface or the measurement points to minimize the square sum until the estimation converges.

4. The form measuring instrument according to claim 2, further comprising a contact form calculator operative to calculate the contact model through a measurement of a known-form, reference form object serving as a calibration reference.

5. The form measuring instrument according to claim 4, wherein the reference form object is a spherical reference ball.

6. The form measuring instrument according to claim 4, wherein the contact form calculator corrects the contact model using the measured value of the object to be measured.

7. The form measuring instrument according to claim 4, wherein the contact form calculator expresses the contact model with one of a free curved surface, a conicoid and a triangular mesh.

8. A form measuring method for measuring a form of a surface of an object to be measured using a contact to follow the surface, the method comprising:
    a pseudo-measurement point acquisition step of acquiring positional coordinates of the reference point of the contact as pseudo-measurement points when the contact touches the object at a plurality of locations;
    a normal vector generation step of estimating a surface or line along the pseudo-measurement points from the pseudo-measurement points to calculate normal vectors extending from the pseudo-measurement points to the surface or line;
    a contact model location step of locating contact models which are located in a pseudo space generated by computing and that specify the surface form of the contact so as to coincide the pseudo-measurement points with reference points of the contact models and so as to coincide attitudes of the contact on measurement with attitudes of the contact models; and
    a measurement point calculation step of calculating cross points as measurement points, at which the normal vectors cross the surfaces of the located contact models.

9. A form measuring method for measuring a form of a surface of an object to be measured using a contact to follow the surface, the method comprising:
    a pseudo-measurement point acquisition step of acquiring positional coordinates of the reference point of the contact as pseudo-measurement points when the contact touches the target at a plurality of locations;
    an orthogonal cross point calculation step of calculating orthogonal cross points to a designed surface defined by designed values of the object from the pseudo-measurement points;
    a contact model location step of locating contact models which are located in a pseudo space generated by computing and that specify the surface form of the contact so as to coincide the pseudo-measurement points with reference points of the contact models and so as to coincide attitudes of the contact on measurement with attitudes of the contact models; and
    a measurement point calculation step of calculating cross points as measurement points, at which straight lines connecting the pseudo-measurement points and the orthogonal cross points cross the designed surfaces of the contact models.

10. The form measuring method according to claim 9, further comprising a setting comparison step of using as an estimation a square sum of distances between the measurement points and the orthogonal cross points, and translating and rotating the designed surface or the measurement points to minimize the square sum until the estimation converges.

11. The form measuring method according to claim 9, further comprising a contact form calculation step of calculating the contact model through a measurement of a known-form, reference form object serving as a calibration reference.

12. The form measuring method according to claim 9, further comprising a contact model correction step of correcting the contact model using the measured value of the object to be measured.

13. The form measuring method according to claim 11, wherein the contact model correction step includes expressing the contact model with one of a free curved surface, a conicoid and a triangular mesh.

14. A computer-executable, form measuring program for measuring a form of surface of an object to be measured using a contact to follow the surface, the program comprising:

a pseudo-measurement point acquisition step of acquiring positional coordinates of the reference point of the contact as pseudo-measurement points when the contact touches the object at a plurality of locations;

a normal vector generation step of estimating a surface or line along the pseudo-measurement points from the pseudo-measurement points to calculate normal vectors extending from the pseudo-measurement points to the surface or line;

a contact model location step of locating contact models which are located in a pseudo space generated by computing and that specify the surface form of the contact so as to coincide the pseudo-measurement points with reference points of the contact models and so as to coincide attitudes of the contact on measurement with attitudes of the contact models; and a measurement point calculation step of calculating cross points as measurement points, at which the normal vectors cross the surfaces of the located contact models.

15. A computer-executable, form measuring program for measuring a form of a surface of an object to be measured using a contact to follow the surface, the program comprising:

a pseudo-measurement point acquisition step of acquiring positional coordinates of the reference point of the contact as pseudo-measurement points when the contact touches the object at a plurality of locations;

an orthogonal cross point calculation step of calculating orthogonal cross points to a designed surface defined by designed values of the object from the pseudo-measurement points;

a contact model location step of locating contact models which are located in a pseudo space generated by computing and that specify the surface form of the contact so as to coincide the pseudo-measurement points with reference points of the contact models and so as to coincide attitudes of the contact on measurement with attitudes of the contact models; and a measurement point calculation step of calculating cross points as measurement points, at which straight lines connecting the pseudo-measurement points and the orthogonal cross points cross the designed surfaces of the contact models.

16. The form measuring program according to claim 15, further comprising a computer-executable, setting comparison step of using as an estimation a square sum of distances between the measurement points and the orthogonal cross points, and translating and rotating the designed surface or the measurement points to minimize the square sum until the estimation converges.

17. The form measuring program according to claim 15, further comprising a computer-executable, contact form calculation step of calculating the contact model through a measurement of a known-form, reference form object serving as a calibration reference.

18. The form measuring program according to claim 15, further comprising a computer-executable, contact model correction step of correcting the contact model using the measured value of the object to be measured.

19. The form measuring program according to claim 17, wherein the contact model correction step includes expressing the contact model with one of a free curved surface, a conicoid and a triangular mesh.

* * * * *